United States Patent
Shin et al.

(10) Patent No.: US 10,397,867 B2
(45) Date of Patent: Aug. 27, 2019

(54) METHOD OF OPERATING USER EQUIPMENT FOR PUBLIC SAFETY MODE AND METHOD OF WIRELESS COMMUNICATION USING THE SAME

(71) Applicant: SAMSUNG ELECTRONICS CO., LTD., Suwon-si, Gyeonggi-do (KR)

(72) Inventors: Chung-Ho Shin, Hwaseong-si (KR); Kyung-Hee Kim, Suwon-si (KR); Kyou-Woong Kim, Seongnam-si (KR); Yun-Jin Kim, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 181 days.

(21) Appl. No.: 15/410,882

(22) Filed: Jan. 20, 2017

(65) Prior Publication Data
US 2018/0035373 A1 Feb. 1, 2018

(30) Foreign Application Priority Data

Jul. 26, 2016 (KR) ........................ 10-2016-0095074

(51) Int. Cl.
*H04W 4/80* (2018.01)
*H04W 8/00* (2009.01)
(Continued)

(52) U.S. Cl.
CPC ......... *H04W 52/0216* (2013.01); *H04W 4/80* (2018.02); *H04W 8/005* (2013.01); *H04W 52/0229* (2013.01); *H04W 76/14* (2018.02); *H04W 88/06* (2013.01); *Y02D 70/00* (2018.01); *Y02D 70/10* (2018.01); *Y02D 70/1242* (2018.01); *Y02D 70/1262* (2018.01); *Y02D 70/14* (2018.01);
(Continued)

(58) Field of Classification Search
None
See application file for complete search history.

(56) References Cited

U.S. PATENT DOCUMENTS 7,167,721 B2   1/2007  Jung
8,989,695 B2   3/2015  Tujkovic et al.
(Continued)

FOREIGN PATENT DOCUMENTS

KR   10-1388672    4/2014
KR   1020150008668 1/2015
KR   1020160002710 1/2016

*Primary Examiner* — Jutai Kao
(74) *Attorney, Agent, or Firm* — F. Chau & Associates, LLC

(57) ABSTRACT

A method of operating a user equipment includes setting a user equipment to enter a public safety mode, converting the user equipment to an idle state when the user equipment enters the public safety mode, and temporarily converting the user equipment from the idle state to a partial wakeup state during the public safety mode. A public safety carrier searching is performed for device-to-device (D2D) communication between the user equipment and a neighboring equipment during the partial wakeup state. The method may efficiently support the D2D communication and reduce power consumption by changing the state of the user equipment into the idle state when entering the public safety mode and temporarily changing the user equipment into the partial wakeup state for public safety carrier searching.

17 Claims, 13 Drawing Sheets

(51) Int. Cl.
*H04W 52/02* (2009.01)
*H04W 76/14* (2018.01)
*H04W 88/06* (2009.01)

(52) U.S. Cl.
CPC .......... *Y02D 70/144* (2018.01); *Y02D 70/164* (2018.01); *Y02D 70/168* (2018.01); *Y02D 70/20* (2018.01); *Y02D 70/21* (2018.01)

(56) References Cited

U.S. PATENT DOCUMENTS

| | | |
|---|---|---|
| 9,066,221 B2 | 6/2015 | Lee |
| 9,185,697 B2 | 11/2015 | Kuchibhotla et al. |
| 2012/0190383 A1* | 7/2012 | Kim .................. G01S 5/0027 455/456.1 |
| 2015/0055532 A1* | 2/2015 | Lu .................. H04W 52/0225 370/311 |
| 2015/0085791 A1 | 3/2015 | Baghel |
| 2015/0230076 A1 | 8/2015 | Hedman et al. |
| 2015/0326998 A1 | 11/2015 | Wanstedt et al. |
| 2016/0037569 A1 | 2/2016 | Kim et al. |
| 2016/0095144 A1* | 3/2016 | Lindoff .................. H04W 24/08 370/329 |
| 2016/0135239 A1* | 5/2016 | Khoryaev ............. H04W 76/14 370/329 |
| 2016/0150493 A1 | 5/2016 | Ji et al. |
| 2018/0092040 A1* | 3/2018 | Heiska ............. H04W 52/0235 |

\* cited by examiner

METHOD OF OPERATING USER EQUIPMENT FOR PUBLIC SAFETY MODE AND METHOD OF WIRELESS COMMUNICATION USING THE SAME

CROSS-REFERENCE TO RELATED APPLICATION

This U.S. Non-provisional application claims priority under 35 USC § 119 from Korean Patent Application No. 10-2016-0095074, filed on Jul. 26, 2016, in the Korean Intellectual Property Office (KIPO), the disclosure of which is incorporated by reference in its entirety herein.

1. TECHNICAL FIELD

The present disclosure relates generally to wireless communication, and more particularly to a method of operating a user equipment for a public safety mode and an associated method of wireless communication.

2. DISCUSSION OF THE RELATED ART

The device-to-device (D2D) communication based on Long-Term Evolution (LTE) adopts a technology that permits wireless terminals or equipments within a certain proximity to exchange data traffic directly without base stations. The D2D communication may permit rapid data transfer between wireless equipments, a decrease in load of base stations, support of commercial service based on location, etc. Thus, the standardization of D2D is in progress by Third Generation Partnership Project (3GPP), which includes proximity service (ProSe) based on LTE standards, group communication system enablers for LTE (GC-SE_LTE), etc. Public safety (PS) is one of the fields of D2D communication being explored, as D2D can provide a backup method of communication in the event that cellular networks fail or are unusable. Standards for the public safety are under discussion and there are many problems associated with the public safety.

SUMMARY

Some embodiments of the inventive concept may provide a method of operating a user equipment capable of efficiently supporting device-to-device (D2D) communication for public safety.

Some embodiments of the inventive concept may provide a method of wireless communication using a method of operating a user equipment capable of efficiently supporting D2D communication for public safety.

According to some embodiments of the inventive concept, a method of operating a user equipment, may include: setting a user equipment to enter a public safety mode, converting (e.g. changing a state of) the user equipment to an idle state when the user equipment enters the public safety mode, temporarily converting the user equipment from the idle state to a partial wakeup state during the public safety mode and performing a public safety carrier searching for device-to-device (D2D) communication between the user equipment and a neighboring equipment during the partial wakeup state.

According to some embodiments of the inventive concept, a method of wireless communication, may include: setting a first user equipment to enter a public safety mode, converting the first user equipment to an idle state when the first user equipment enters the public safety mode, temporarily converting the first user equipment from the idle state to a partial wakeup state during the public safety mode, transmitting a synchronization channel signal by a second user equipment located near (e.g. within a communicative range of) the first user equipment for synchronization of a device-to-device (D2D) communication during the partial wakeup state, performing a public safety carrier searching by the first user equipment for the D2D communication between the first user equipment and the second user equipment during the partial wakeup state and when a frequency synchronization between the first user equipment and the second user equipment is completed, performing the D2D communication between the first user equipment and the second user equipment.

The method of operating a user equipment and the associated wireless communication method according to some embodiments of the inventive concept may efficiently support the D2D communication and reduce power consumption by converting the user equipment into the idle state when entering the public safety mode and temporarily converting the user equipment into the partial wakeup state for public safety carrier searching.

BRIEF DESCRIPTION OF THE DRAWINGS

The present disclosure will be more clearly understood from the following detailed description taken in conjunction with the accompanying drawings.

DETAILED DESCRIPTION OF THE EMBODIMENTS

Figure 1:
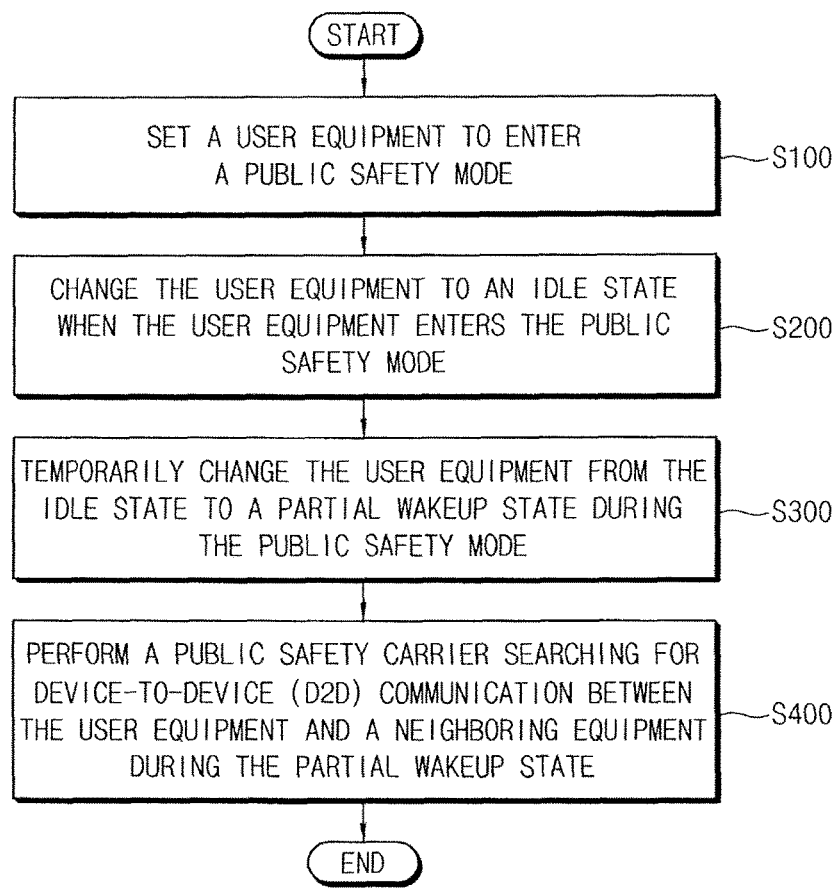
FIG. 1 is a flow chart illustrating a method of operating a user equipment according to some embodiments of the inventive concept.

Various embodiments of the inventive concept will be disclosed more fully hereinafter with reference to the accompanying drawings, in which some embodiments are shown for illustrative purposes. In the drawings, like numerals refer to like elements throughout. The repeated descriptions may be omitted.

A person of ordinary skill in the art should appreciate that work on standards for device-to-device (D2D) communication are in progress and the D2D service will be available for use by common mobile phones and other wireless devices. D2D may be applied to various fields that include but is not limited to public safety. However, the present standard mentions the public safety in case that a user equipment is connected to a wireless network of a base station, but the present standard is silent about operations during an idle state of the user equipment. In this disclosure, operations of a user equipment based on a battery sensitive to power consumption are proposed.

FIG. 1 is a flow chart illustrating a method of operating a user equipment according to some embodiments of the inventive concept.

Referring to FIG. 1, a user equipment (UE) or a user terminal is set to enter a public safety (PS) mode (S100). For example, the user equipment may be a ProSe-enabled PS UE, which supports proximity-based service (ProSe) specified by the 3GPP 23.303 standard. The user equipment may be referred to as PS-LTE equipment. An artisan understands that the inventive concepts disclosed herein are not limited to the 3GPP 23.303 standard.

With continued reference to FIG. 1, the user equipment is converted to an idle state when the user equipment enters the public safety mode (S200). In the idle state, power is not totally off but a minimum of functionality is on to reduce power consumption. The user equipment may return to a wakeup state for performing a normal operation when particular conditions are matched during the idle state.

The user equipment is temporarily converted from the idle state to a partial wakeup state during the public safety mode (S300). The partial wakeup state corresponds to an intermediate state between the wakeup state and the idle state. In other words, the power consumption of the partial wakeup state is higher than the idle state and lower than the wakeup state. The word "temporarily" indicates that the duration time of the partial wakeup state is shorter than the duration time of the idle state. For example, the duration time of the idle state may be about a few seconds and the duration time of the partial wakeup state may be a few through tens of milliseconds.

A public safety carrier searching is performed for a device-to-device (D2D) communication between the user equipment and a neighboring equipment during the partial wakeup state (S400). The public safety carrier searching may include synchronization for the D2D communication and the synchronization may include synchronization of frequencies of oscillators in the user equipments performing the D2D communication. Also, the synchronization may include setting proper timings of signals transferred between the user equipments.

In some embodiments of the inventive concept, as will be described below with reference to FIG. 2, a reception portion of the user equipment may be enabled for the public safety carrier searching and the other portions of the user equipment except the reception portion may be disabled during the partial wakeup state. The reception portion may be disabled during the idle state.

In other embodiments of the inventive concept, as will be described below with reference to FIG. 9, a reception portion and a transmission portion of the user equipment may be enabled for the public safety carrier searching and transmission of the synchronization channel signal and the other portions of the user equipment except the reception portion and the transmission portion may be disabled during the partial wakeup state. The reception portion and the transmission portion may be disabled during the idle state.

Accordingly, the method of operating a user equipment according to various embodiments may efficiently support the D2D communication and reduce power consumption by converting the user equipment into the idle state when entering the public safety mode and temporarily converting the user equipment into the partial wakeup state for public safety carrier searching.

Figure 2:
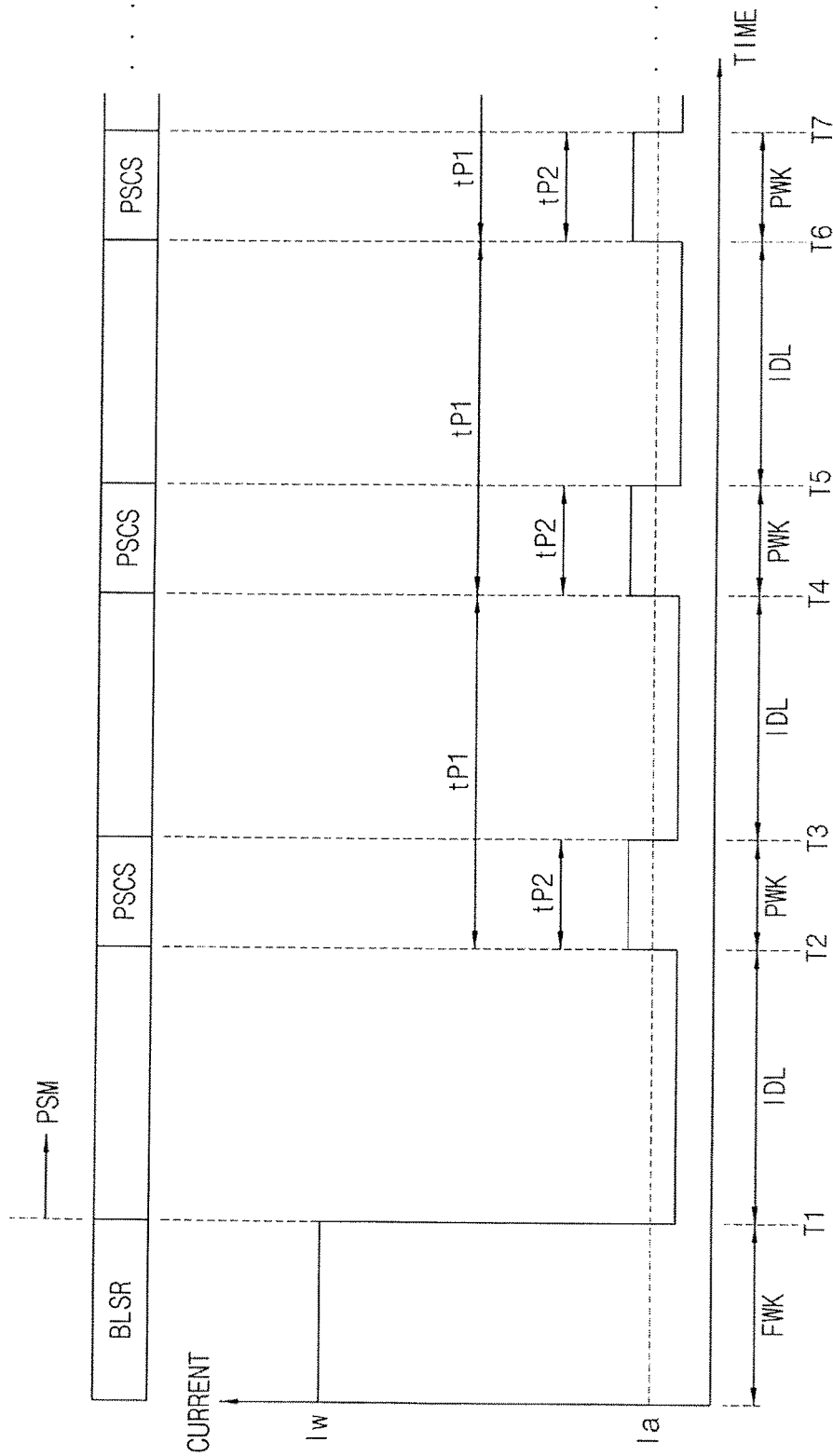
FIG. 2 is a timing diagram illustrating a method of operating a user equipment according to an embodiment.

FIG. 2 is a timing diagram illustrating a method of operating a user equipment according to an embodiment of the inventive concept.

Referring to FIG. 2, a user equipment may enter a public safety mode "PSM" shown at time point T1.

In some embodiments, the user equipment may enter the PSM when the user equipment is out of network coverage of a base station or an evolved node B (eNB). The network coverage indicates a spatial range or a state in which the user equipment may communicate with the base station.

If the user equipment is placed in the out-of-coverage state, the user equipment performs blind searching BLSR for searching all frequency bands in a full wake state (FWK as shown in FIG. 2). The blind searching BLSR takes a long time and an operation current Iw is very large as illustrated in FIG. 2 and thus power consumption is increased. According to various embodiments, the public safety mode PSM may be launched at time point T1 when the blind searching BLSR has ended in failure. The public safety mode PSM may be launched autonomously without an action of the user.

In other embodiments of the inventive concept, even though the user equipment is in the network coverage of the base station, the user equipment may enter the public safety mode PSM based on selection of the user, that is, a mode selection of the user.

At time point T1, when the user equipment enters the public safety mode PSM, the user equipment is converted to an idle state "IDL". During the public safety mode PSM, the user equipment is temporarily converted from the idle state IDL to a partial wakeup state "PWK". For example, the user equipment may be converted from the idle state IDL to the partial wakeup state PWK by a period of a first time interval tP1, and the user equipment can be converted back to the idle state IDL after maintaining the partial wakeup state PWK by a second time interval tP2. In other words, as illustrated in FIG. 2, the user equipment may be converted from the idle state IDL to the partial wakeup state PWK at time points T2, T4 and T6 and the user equipment may be converted back to the idle state IDL at time points T3, T5 and T7.

The user equipment performs a public safety carrier searching "PSCS" for the D2D communication between the user equipment and a neighboring equipment during the partial wakeup state PWK. As such, if the user equipment enters the public safety mode PSM, the blind searching BLSR for connection to the base station and all operations based on the network connection are stopped and only the public safety carrier searching PSCS is performed. Although not illustrated in FIG. 2, if the public safety carrier is detected, the user equipment may enter a public safety communication mode after an authentication procedure as will be described below.

Figure 5:
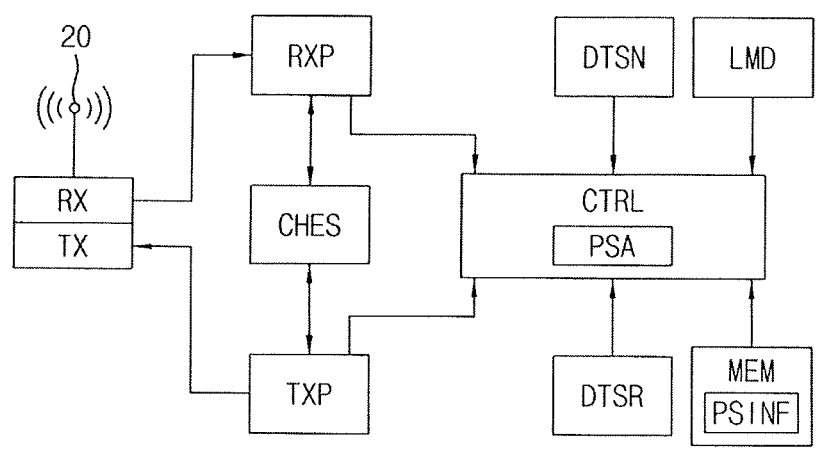
FIG. 5 is a block diagram illustrating one of the various types of user equipment according to an embodiment of the inventive concept.

During the partial wakeup state PWK, a reception portion of the user equipment, for example, RX and RXP in FIG. 5, may be enabled for the public safety carrier searching PSCS and the other portions of the user equipment except the reception portion may be disabled during the partial wakeup state PWK. The reception portion may be disabled during the idle state IDL.

As described above, during the public safety mode PSM, the duration time TP2 of the partial wakeup state PWK may be set to be sufficiently shorter than the duration time tP1-tP2 of the idle state IDL shown in FIG. 2. For example, the duration time tP1-tP2 of the idle state IDL may be about a few seconds and the duration time tP2 of the partial wakeup state PWK may be a few milliseconds through tens of milliseconds. As a result, the average current "Ia" during the public safety mode PSM may be maintained at a lower level and thus power consumption may be reduced significantly.

As such, the method of operating the user equipment according to some embodiments of the inventive concept may efficiently support the D2D communication and reduce power consumption by converting the user equipment into the idle state IDL when entering the public safety mode PSM and temporarily converting the user equipment into the partial wakeup state PWK for public safety carrier searching PSCS.

Figure 3:
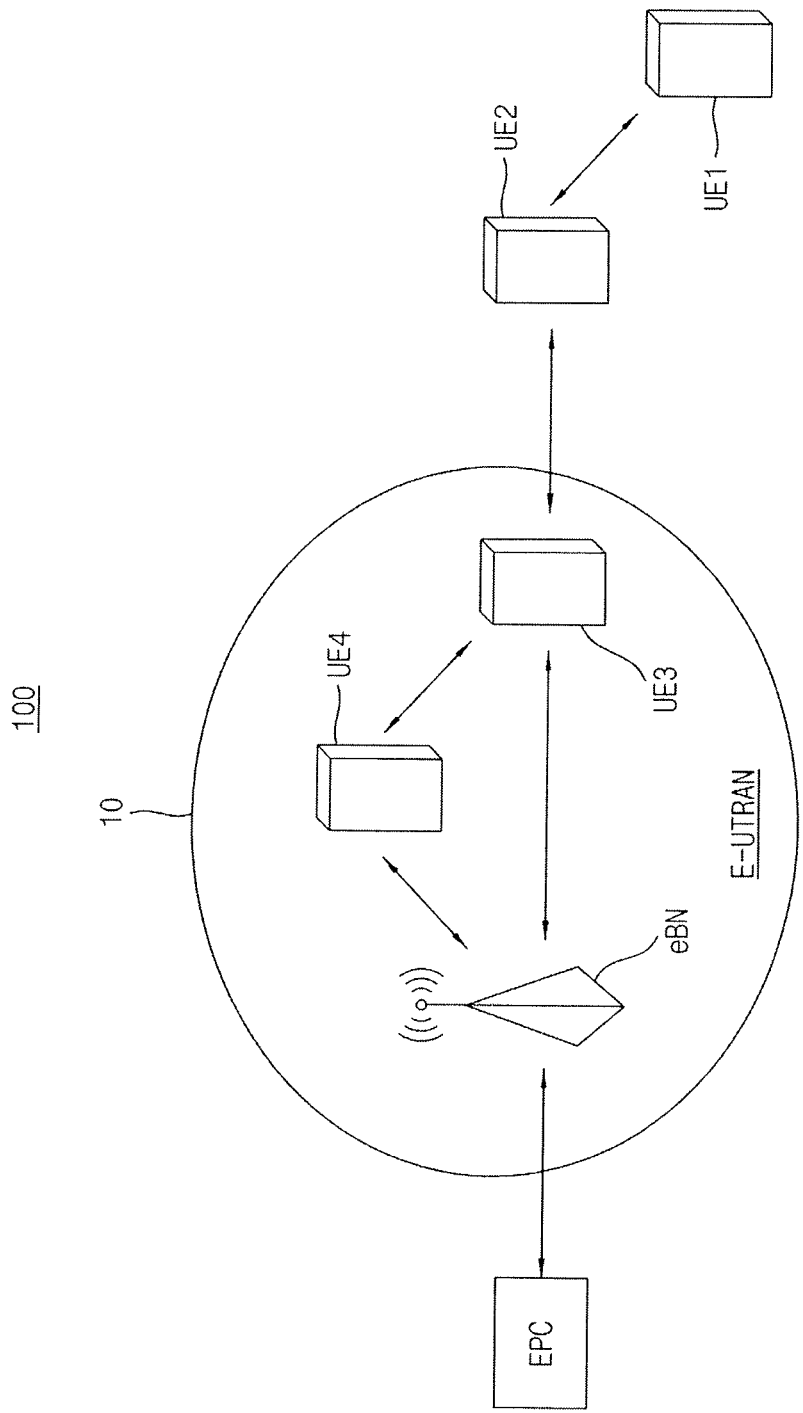
FIG. 3 is a diagram illustrating one example of the various types of network architecture that may be associated with the method of operating user equipment.
Figure 4:
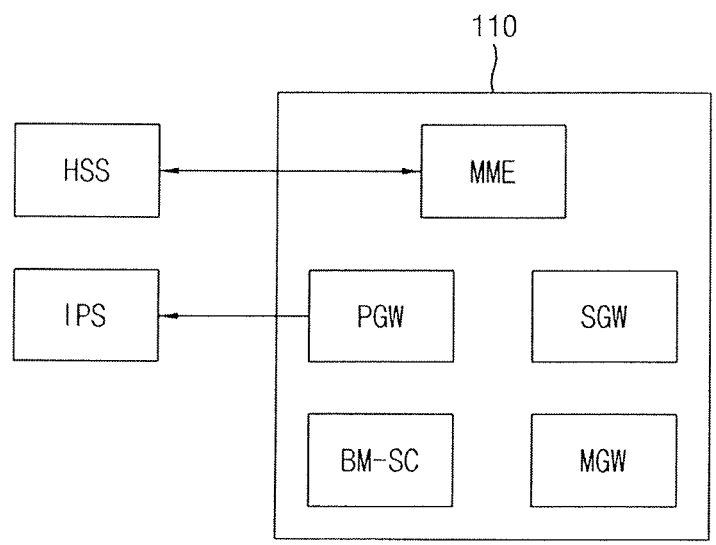
FIG. 4 is a diagram illustrating an example of an evolved packet core included in the network architecture of FIG. 4.

FIG. 3 is a diagram illustrating an example of network architecture, and FIG. 4 is a diagram illustrating an example of an evolved packet core included in the network architecture of FIG. 4. A long term evolution (LTE) network architecture 100 of FIG. 3 may be referred to as an Evolved Packet System (EPS).

Referring to FIGS. 3 and 4, the EPS 100 may include one or more user equipments UE1~UE4, a network (e.g., an Evolved UMTS Terrestrial Radio Access Network (E-UTRAN)) 10, an Evolved Packet Core (EPC) 110, a Home Subscriber Server (HSS), and an Operator's Internet Protocol Service (IPS). The EPS 100 can interconnect with other access networks, but for simplicity those entities/interfaces are not shown.

Although FIG. 3 illustrates that the E-UTRAN 10 includes a single evolved Node B (eNB), the E-UTRAN 10 may be comprised of two or more eNBs. The eNB provides user and control planes protocol terminations toward the user equipments UE1~UE4. The eNB may be connected to the other eNBs via a backhaul (e.g., an X2 interface). The eNB may also be referred to as a base station, a Node B, an access point, a base transceiver station, a radio base station, a radio transceiver, a transceiver function, a basic service set (BSS), an extended service set (ESS), or some other suitable terminology.

The eNB provides an access point to the EPC 110 for the user equipments UE1~UE4. Examples of the user equipments UE1~UE4 include but are not limited to a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The user equipment may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The EPC 110 may include, for example, a Mobility Management Entity MME, a Serving Gateway SGW, a Multimedia Broadcast Multicast Service (MBMS) Gateway MGW, a Broadcast Multicast Service Center BM-SC, and a Packet Data Network Gateway PGW. The MME is the control node that processes the signaling between the user equipment and the EPC 110. Generally, the MME provides bearer and connection management including idle mode UE paging and tagging procedures.

All user IP packets are transferred through the SGW, which itself is connected to the PGW. The PGW provides user equipment IP address allocation as well as other functions. The PGW is connected to the IPS. The IPS may include the Internet, an intranet, an IP Multimedia Subsystem (IMS), and a PS Streaming Service (PSS). The BM-SC may provide functions for MBMS user service provisioning and delivery. The BM-SC may serve as an entry point for content provider MBMS transmission, may be used to authorize and initiate MBMS Bearer Services within a public land mobile network (PLMN), and may be used to schedule and deliver MBMS transmissions. The MGW may be used to distribute MBMS traffic to the eNBs belonging to a Multicast Broadcast Single Frequency Network (MBSFN) area broadcasting a particular service, and may be responsible for session management (start/stop) and for collecting eMBMS related charging information.

In FIG. 3, the first user equipment UE1 and the second user equipment UE2 are out of the network coverage 10 and the third user equipment UE3 and the fourth user equipment UE4 are within the network coverage 10. Some of the embodiments of the inventive concept are provided to support communications with the user equipments UE1 and UE2 out of the network coverage 10. However, the counterpart of communication needs not be out of the network coverage 10.

For example, some of the embodiments of the inventive concept may support communication between the second user equipment UE2 out of the network coverage 10 and the third user equipment UE3 in the network coverage 10, as well as the communication between the first and second user equipments UE1 and UE2 out of the network coverage 10. In this disclosure, "out of network coverage" may indicate a state of malfunction of the eNB as well as the user equipment is far away from the eNB.

FIG. 5 is a block diagram illustrating a user equipment according to an embodiment of the inventive concept.

Referring to FIG. 5, a user equipment UE may include, for example, an antenna 20, a receiver RX, a transmitter TX, a reception processor RXP, a transmission processor TXP, a channel estimator CHES, a controller CTRL, a data sink DTSN, a data source DTSR, a memory module MEM and a location module LMD, etc.

Hereinafter, descriptions of communication between the user equipment UE and the base station eNB are omitted and examples of uplink and downlink of D2D communication between the user equipments are omitted.

In the uplink of the D2D communication, the data source DTSR provides upper layer packets to the controller or processor CTRL. The data source DTSR represents all protocol layers above the L2 layer. The controller CTRL may implement the L2 and L3 layers. In the uplink of the D2D communication, the controller CTRL may provide operations based on various priority metrics. The controller CTRL may be also responsible for HARQ operations, transmission of signals to the other user equipments and retransmission of lost packets.

With continued reference to FIG. 5, the transmission processor TXP implements various signal processing functions for the L1 layer (i.e., physical layer). The signal processing functions may include coding and interleaving to facilitate forward error correction (FEC) at the user equipment UE and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream.

The OFDM stream is spatially precoded to produce multiple spatial streams. Channel estimates from the channel estimator CHES may be used to determine the coding and modulation scheme, as well as for spatial processing. The channel estimate may be derived from a reference signal and/or channel condition feedback transmitted by the user equipment UE. Each spatial stream may be provided to the antenna 20 via a separate transmitter TX. The transmitter TX may modulate an RF carrier with a respective spatial stream for transmission.

In the downlink of the D2D communication, the receiver RX receives a signal through the antenna 20. The receiver RX recovers information modulated onto an RF carrier and provides the information to the reception processor RXP. The reception processor RXP implements various signal processing functions of the L1 layer. The RX processor RXP may perform spatial processing on the information to recover any spatial streams destined for the user equipment UE. If multiple spatial streams are destined for the user equipment UE, they may be combined by the reception processor RXP into a single OFDM symbol stream.

The reception processor RXP converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the other user equipment. These soft decisions may be based on channel estimates computed by the channel estimator CHES. The soft decisions are then decoded and de-interleaved to recover the data and control signals that were originally transmitted by the other user equipment on the physical channel. The data and control signals are then provided to the controller CTRL.

The controller CTRL implements the L2 and L3 layers. The controller CTRL may be associated with the memory MEM that stores program codes and data. The memory MEM may be referred to as a non-transitory computer-readable medium. In the downlink of the D2D communication, the controller CTRL provides demultiplexing between transport and logical channels, packet reassembly, deciphering, header decompression, control signal processing to recover upper layer packets from the core network. The upper layer packets are then provided to the data sink DTSN, which represents all the protocol layers above the L2 layer. Various control signals may also be provided to the data sink DTSN for L3 processing. The controller CTRL is also responsible for error detection using an acknowledgement (ACK) and/or negative acknowledgement (NACK) protocol to support HARQ operations.

The location module LMD may track the location of the user equipment UE. For example, the location module may comprise a global positioning system (GPS) unit that determines the location of the user equipment UE through a link with a GPS satellite and stores the location as GPS coordinates. The location module LMD may provide information on the location of the user equipment UE to the controller CTRL.

According to some embodiments of the inventive concept, the controller CTRL may perform a public safety application PSA. According to some embodiments, the public safety application PSA may be performed by another processor that is in the higher layer than the controller CTRL.

The public safety application PSA may control entering the public safety mode PSM, converting between the idle state IDL and the partial wakeup state PWK during the public safety mode PSM and public safety carrier searching PSCS during the partial wakeup state PWK as described above. In addition, as described below with reference to FIGS. 7 and 8, the public safety application PSA may provide a user interface for entering the public safety mode PSM. Furthermore, as described below with reference to FIGS. 9 and 12, the public safety application PSA may control transmission of a synchronization channel signal or a beacon message during the partial wakeup state PWK of the user equipment.

The public safety application PSA may control the above mentioned public safety carrier searching PSCS and time/frequency synchronization based on public safety information PSINF including a public safety frequency and an identifier for the D2D communication stored in the user equipment UE. Even though FIG. 5 illustrates that the public safety information PSINF are stored in the memory MEM, the public safety information PSINF may be stored in UICC or USIM.

In some embodiments of the inventive concept, the public safety information PSINF may include information on the public safety frequency. The information on the public safety frequency may be comprised of predetermined values or values provided through the last communication with a base station. In some example embodiments, the public safety information may include information on the identifier for the D2D communication. For example, the information on the identifier may include a list of identifiers corresponding to a highest priority. If the counterpart user equipment corresponds to the highest priority, the user equipment UE may omit the authentication procedure.

Those skilled in the art should understand and appreciate that the public safety application PSA may be implemented as hardware, software and combination of hardware and software. For example, the public safety application PSA may be implemented as program codes stored in the computer-readable medium. The computer-readable program codes may be provided to a processor such as the controller CTRL of the user equipment UE for execution.

Figure 6:
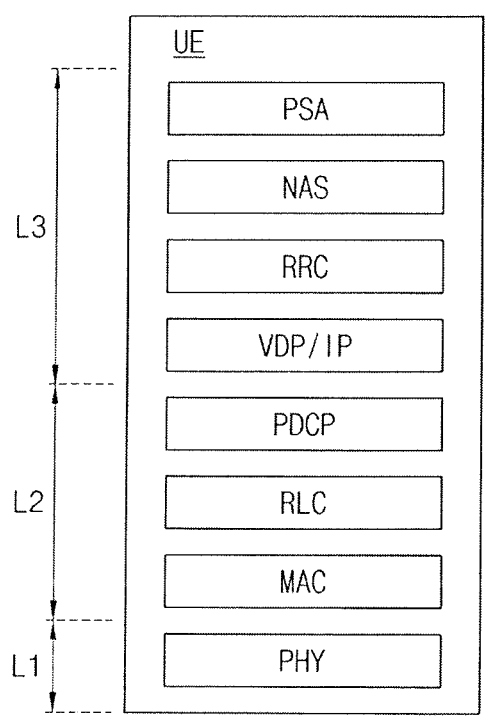
FIG. 6 is a diagram illustrating an embodiment of a protocol architecture of device-to-device (D2D) communication for public safety.

FIG. 6 is a diagram illustrating an example embodiment of a protocol architecture of device-to-device (D2D) communication for public safety.

Referring to FIG. 6, the radio protocol architecture for the user equipment UE is shown with three layers: Layer 1, Layer 2, and Layer 3. Layer 1 (L1 layer) is the lowest layer and implements various physical layer signal processing functions. The L1 layer may be referred to herein as the physical (PHY) layer. Layer 2 (L2 layer) is above the physical layer and is responsible for the link between the user equipments over the physical layer. The L2 layer includes a media access control (MAC) sublayer, a radio link control (RLC) sublayer, and a packet data convergence protocol (PDCP) sublayer. The L3 layer includes a public safety application (PSA) layer, a non-access stratum (NAS)

protocol sublayer, a radio resource control (RRC) sublayer and user datagram protocol (UDP)/IP sublayer.

When the public safety application PSA is activated by a user of the user equipment UE, the public safety application PSA may send an indication to the NAS. For example, the public safety application PSA may be utilized to communicate emergency messages by members of a police department, fire department, or other public safety personnel. In response to the indication, NAS may configure itself and may optionally configure RRC. For example, the configuration performed by NAS may involve setting an individual IP address for the user equipment UE, a priority for the groups handling, and an IP multicast address for the groups in which the user equipment UE has the group membership. The NAS may also configure a bearer specific to D2D broadcast communication and associated traffic flow templates (TFTs).

For example, the RRC sublayer may autonomously transition to a D2D communication state to allow for D2D communication with one or more user equipments when the user equipment UE (e.g. as shown in FIG. 6) is out of network coverage. In some example embodiments, such autonomous transition may be achieved by an indication (e.g., a broadcast public safety communication indication) received by the RRC from either the public safety application running on the user equipment, or from NAS when NAS receives this indication from the public safety application PSA. For example, whenever the public safety application PSA is initiated by the user of the user equipment UE, the previously-described indication may be provided to the RRC. In response to the indication, the RRC may transition to a new (e.g. another) state (e.g., a "D2D-Idle" state or a "D2D-Connected" state, which may also collectively be referred to as a "D2D communication state") with respect to the presently available RRC states (e.g., "RRC Idle" or "RRC Connected"). The new state of the RRC is specific for D2D broadcast communication operations.

The transition from the D2D-Idle state to the D2D-Connected state can take place in following manner. For example, when the public safety application PSA is activated in the user equipment UE, the RRC enters the D2D-Idle state. If the user equipment UE has information to transmit, the user equipment UE enters the D2D-Connected state and transmits an identity of the group (e.g., a group ID) to which the user equipment UE belongs and/or an identity of the transmitter (e.g., a source ID associated with the user equipment UE) on one particular channel to which all other D2D-Idle user equipments are listening. Alternatively, the user equipment UE transmits the group ID and/or source ID in a specified time slot which all other D2D-Idle user equipments are listening.

For example, the user equipments belonging to the same group enter the D2D-Connected state and start to monitor the complete band for communications. After transmitting a group activation (or group session announcement) for some predefined times at which communications will occur, the user equipment UE may begin transmission. Accordingly, since the user equipments of a particular group enter the D2D-Connected state at the predefined times when transmissions will occur, the power consumption in the user equipments can be reduced by having D2D communications being conducted at the predefined times. A person of ordinary skill in the art should understand that the predefined times can be provided as respective times when the D2D communications begin, or can be provided, for example, as a time ranges when D2D communications may begin and end.

In addition, for example, when the public safety application PSA is activated, the user equipment UE may enter the D2D-Connected state. In the event of such an occurrence, all the user equipments in the group may enter and remain in the D2D-Connected state all the time (as soon as the public safety application PSA is activated). For example, a group session announcement may be transmitted by the user equipment UE to prevent all user equipments from entering and remaining in the D2D-Connected state all the time. For example, once a session announcement is received by one user equipment, the UE may start to monitor each subframe (assigned for D2D communication) for the duration of a preconfigured in-activity timer. This in-activity timer is reset every time a packet is sent/received before entering the D2D-Idle state. A session ID can also be part of the group session announcement and there can be one in-activity timer per session ID. The session ID can be part of each MAC subheader and session announcement MAC CE.

When the RRC transitions to the new state specific for D2D broadcast communication in response to an indication from the public safety application PSA, the RRC may configure other protocol layers, such as the PDCP layer, the RLC layer, the MAC layer, and/or the physical layer for D2D broadcast operations. The RRC can have this information pre-configured so that the RRC can function in an out of network coverage scenario as well.

With continued reference to FIG. 6, the PDCP sublayer provides multiplexing between different radio bearers and logical channels. The PDCP sublayer also provides header compression for upper layer data packets to reduce radio transmission overhead, and provides security by ciphering the data packets. The RLC sublayer provides segmentation and reassembly of upper layer data packets, retransmission of lost data packets, and reordering of data packets to compensate for out-of-order reception due to hybrid autonomously repeat request (HARQ). The MAC sublayer provides multiplexing between logical and transport channels. The MAC sublayer is also responsible for allocating the various radio resources (e.g., resource blocks) in one cell among the user equipments. The MAC sublayer is also responsible for HARQ operations.

Figure 7:
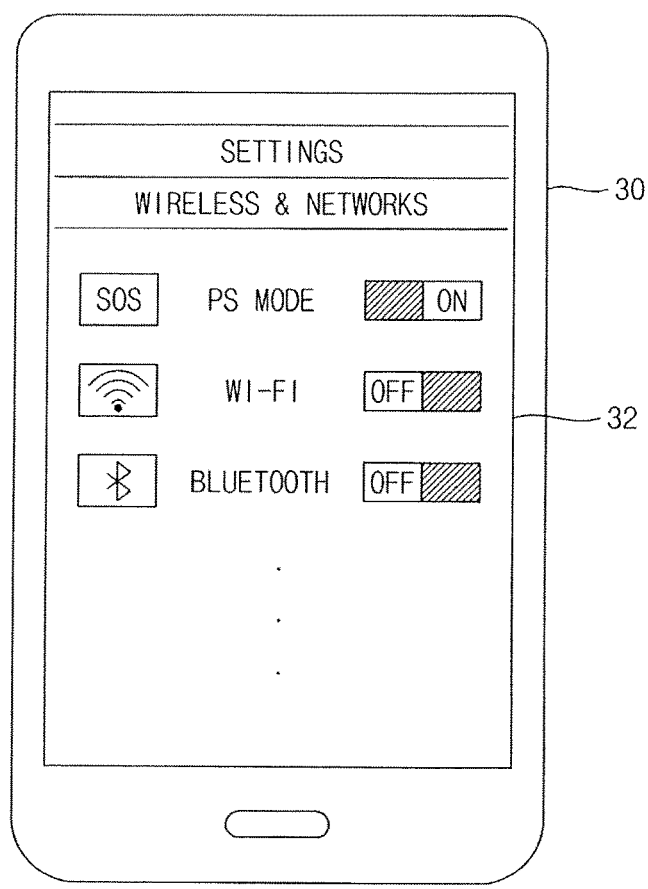
FIGS. 7 and 8 are diagrams illustrating some non-limiting examples of user interface associated with public safety according to various embodiments of the inventive concept.
Figure 8:
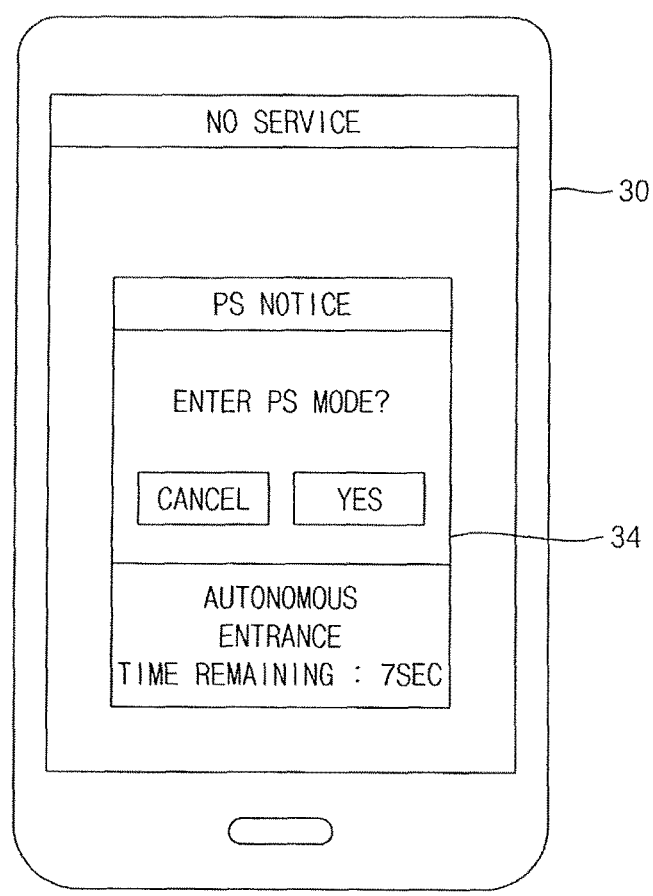

FIGS. 7 and 8 are diagrams illustrating examples of a user interface associated with public safety according to some embodiments of the inventive concept.

Referring to FIG. 7, a user may determine through a user interface 32 of a user equipment 30 whether the user equipment 30 is set to enter the public safety (PS) mode. From the user interface 32, a user can set the public safety mode on or off. In some embodiments, the user interface 32 in FIG. 7 may be provided by an operating system (OS) or by other applications of the user equipment 30. After the user selects the items "SETTINGS" and "WIRELESS & NETWORKS", the user may set the PS mode to "ON" to perform a public safety application PSA. As described above, the public safety application PSA may control entering the public safety mode PSM, converting between the idle state IDL and the partial wakeup state PWK during the public safety mode PSM and public safety carrier searching PSCS during the partial wakeup state PWK. In addition, as will be described below with reference to FIGS. 9 and 12, the public safety application PSA may control transmission of a synchronization channel signal or a beacon message during the partial wakeup state PWK.

Referring to FIG. 8, the user equipment 30 may determine whether the user equipment 30 is out of range of the network coverage of a base station and then, when it is determined that the user equipment 30 is out of range of the network coverage, the user equipment 30 may provide a user interface 34 for selecting whether to set the user equipment 30 to enter the PS mode.

When it is determined that the user equipment 30 is out of range of the network coverage, the user equipment 30 displays an indication, for example, "NO SERVICE" to indicate the out-of-coverage state and the OS or other applications of the user equipment 30 may provide the user interface 34. An artisan should understand and appreciate that the indication of the out-of-coverage state may be, for example, a symbol, so that the user may determine whether to enter the PS mode. The user may press the "YES" button to perform the above-mentioned public safety application PSA. As described above, the public safety application PSA may control entering the public safety mode PSM, converting between the idle state IDL and the partial wakeup state PWK during the public safety mode PSM and public safety carrier searching PSCS during the partial wakeup state PWK. In addition, as will be described below with reference to FIGS. 9 and 12, the public safety application PSA may control transmission of a synchronization channel signal or a beacon message during the partial wakeup state PWK.

In some embodiments of the inventive concept, when the user does not select setting the user equipment 30 to enter the PS mode within an internal reference time, the user equipment 30 may autonomously enter the PS mode. The user interface 34 of FIG. 8 may display the remaining time (e.g. time left) for the autonomous entrance to the public safety mode.

Figure 9:
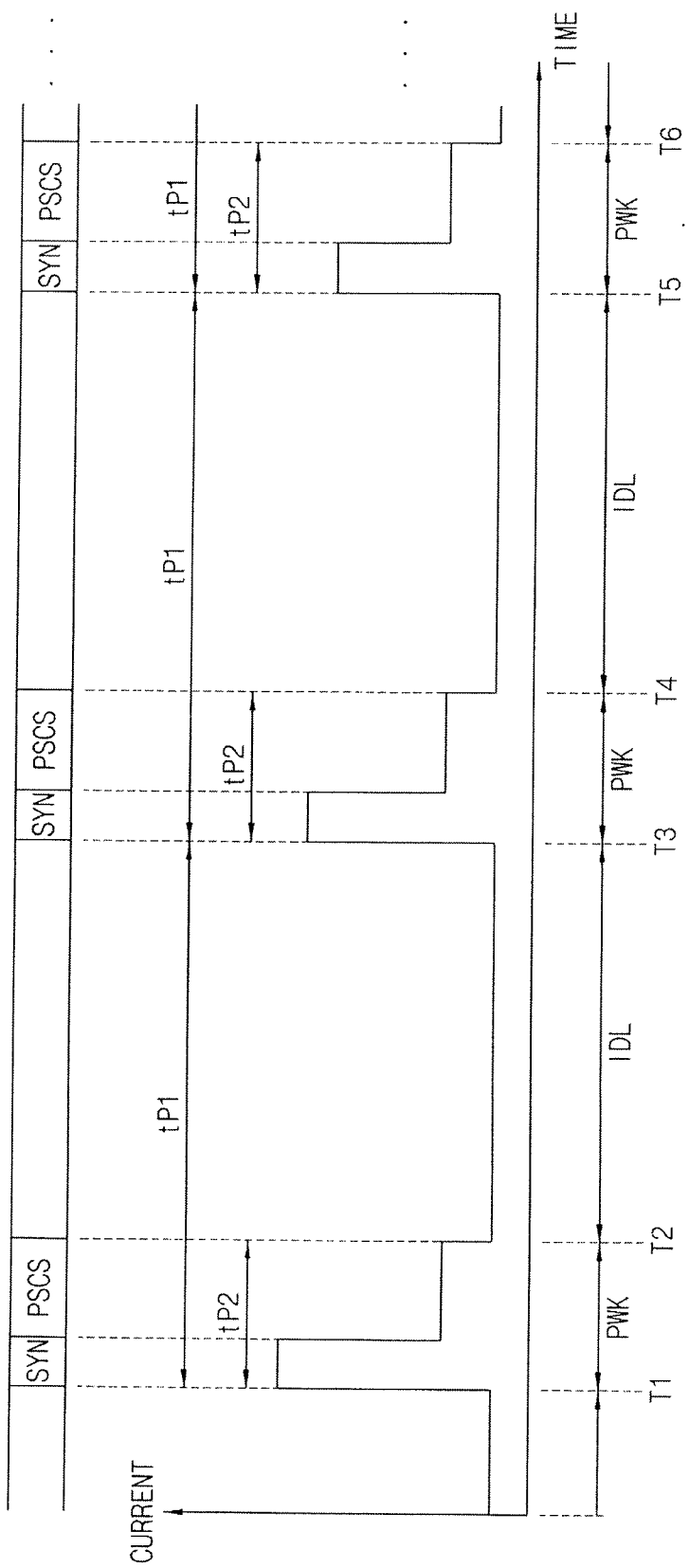
FIG. 9 is one non-limiting example of a timing diagram illustrating a method of operating a user equipment according to various embodiments of the inventive concept.

FIG. 9 is a timing diagram illustrating a method of operating a user equipment according to an embodiment of the inventive concept.

FIG. 9 illustrates some of the operations of a user equipment after the user equipment enters the public safety mode PSM. In some embodiments, the user equipment may enter the public safety mode PSM when the user equipment is out of range of network coverage of a base station or an evolved node B (eNB). The network coverage indicates a spatial range or a state the user equipment may communicate with the base station. In other example embodiments, even though the user equipment is in the network coverage of the base station, the user equipment may enter the public safety mode PSM based on selection of the user, that is, a mode selection of the user.

Referring to FIG. 9, during the public safety mode PSM, the user equipment is temporarily converted from the idle state IDL to a partial wakeup state PWK. For example, the user equipment may be converted from the idle state IDL to the partial wakeup state PWK by a period of a first time interval tP1, and the user equipment is converted back to the idle state IDL after maintaining the partial wakeup state PWK by a second time interval tP2. In other words, as illustrated in FIG. 9, the user equipment may be converted from the idle state IDL to the partial wakeup state PWK at time points T1, T3 and T5 and the user equipment may be converted back to the idle state IDL at time points T2, T4 and T6.

The user equipment performs a public safety carrier searching PSCS for the D2D communication between the user equipment and a neighboring equipment during the partial wakeup state PWK. As such, if the user equipment enters the public safety mode PSM, the blind searching BLSR for connection to the base station and all operations based on the network connection are stopped and only the public safety carrier searching PSCS is performed. Even though not illustrated in FIG. 9, if the public safety carrier is detected, the user equipment may enter a public safety communication mode after an authentication procedure that will be described below. In addition, the user equipment may further perform transmission SYN of a synchronization channel signal for synchronization of the D2D communication during the partial wakeup state PWK.

During the partial wakeup state PWK, a reception portion of the user equipment, for example, RX and RXP in FIG. 5, and a transmission portion, for example, TX and TXP in FIG. 5, may be enabled for the public safety carrier searching PSCS and transmission SYN of the synchronization channel signal, and the other portions of the user equipment except the reception portion and the transmission portion may be disabled during the partial wakeup state PWK. The reception portion and the transmission portion may be disabled during the idle state IDL.

As described above, during the public safety mode PSM, the duration time TP2 of the partial wakeup state PWK may be set to be substantially shorter than the duration time tP1-tP2 of the idle state IDL. For example, the duration time tP1-tP2 of the idle state IDL may be about a few seconds and the duration time tP2 of the partial wakeup state PWK may be a few milliseconds through tens of milliseconds. As a result, the average current during the public safety mode PSM may be maintained at a lower level, and thus power consumption may be reduced significantly.

As such, the method of operating the user equipment according to some embodiments of the inventive concept may efficiently support the D2D communication and reduce power consumption by converting the user equipment into the idle state IDL when entering the public safety mode PSM, and temporarily converting the user equipment into the partial wakeup state PWK for public safety carrier searching PSCS and transmission SYN of the synchronization channel signal.

Figure 10:
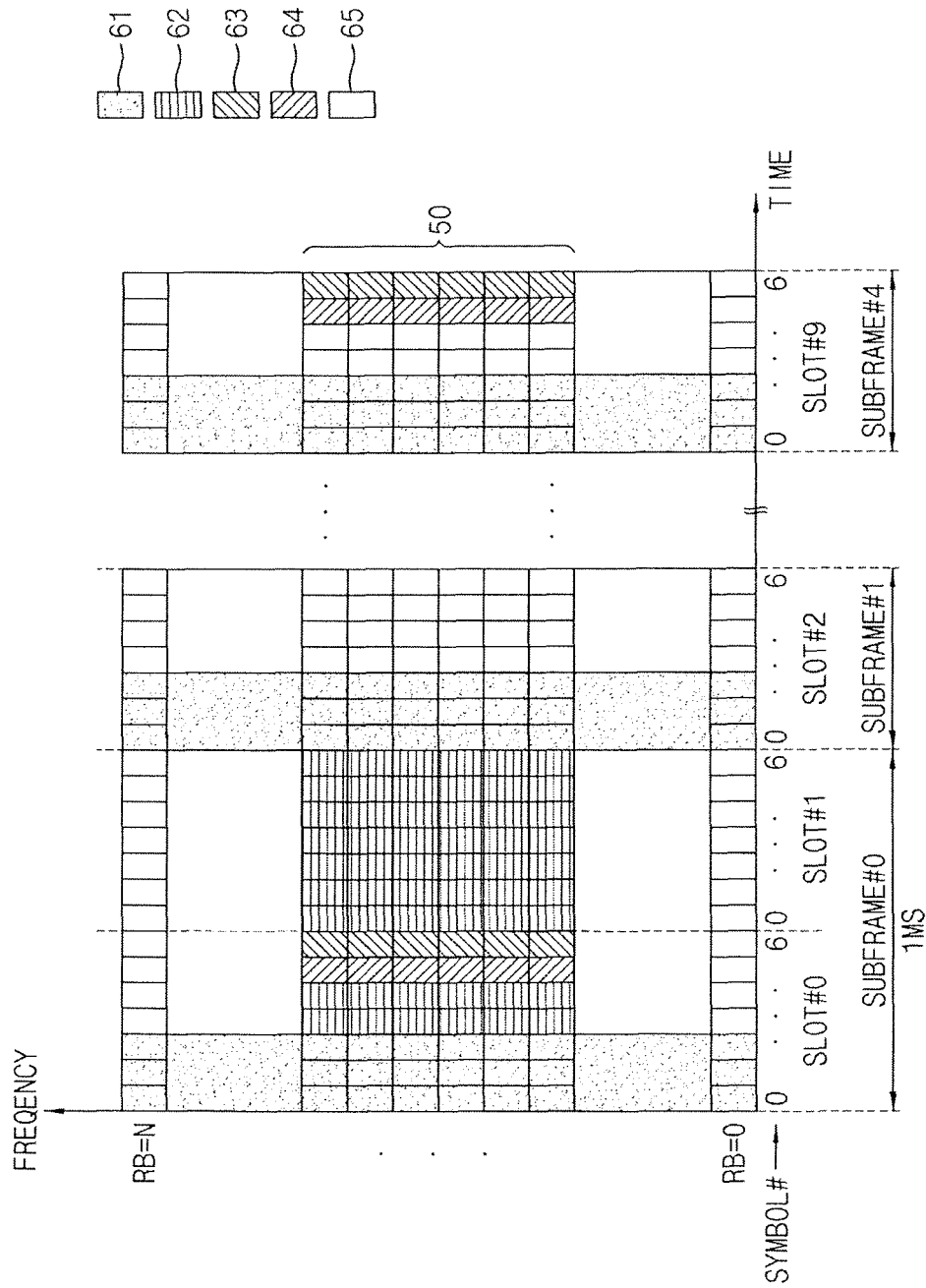
FIG. 10 is a diagram illustrating one example of a synchronization channel signal that may be used in the method of FIG. 9.

FIG. 10 is a diagram illustrating an example of a synchronization channel signal that may be used in the method of FIG. 9.

FIG. 10 illustrates an example of a frame of a synchronization channel signal. Referring to FIG. 10, a frame may be divided into equally sized subframes. FIG. 10 illustrates a non-limiting example of five subframes, and the number of the subframes may be determined variously.

Each subframe may include two consecutive time slots. A resource grid may be used to represent two time slots, each time slot including a resource block RB. The resource grid may be divided into multiple resource elements. In LTE, a resource block contains N consecutive subcarriers in the frequency domain and, for a normal cyclic prefix in each OFDM symbol, 7 consecutive OFDM symbols in the time domain.

FIG. 10 shows how the OFDM symbol is allocated between the user equipments performing the D2D communication. For example, according to international standards, a primary synchronization signal (PSS) 63 may be included in the last symbol of the zero-th slot SLOT#0 and ninth slot SLOT#9 and a secondary synchronization signal 64 may be included in the symbol next to the last symbol of the zero-th slot SLOT#0 and ninth slot SLOT#9. Also, the position of the PBCH 62 including the master information broadcasting (MIB) information may be determined. If the synchronization is translated, information on the frame boundary and identifier (ID) may be obtained. If the MIB information is decoded, information on present frequency bandwidth and system frame number (SFN) and control channel information 61 may be obtained. After that, through random access procedure, the D2D communication may be performed via data channel 65.

In some embodiments of the inventive concept, the synchronization channel signal may include information on a location of the user equipment which is in the public safety mode PSM. For example, the information on the location of the user equipment may be provided from the location module LMD in FIG. 5 and may be included in the data channel 65 of the synchronization channel signal of FIG. 10. Even though the user equipment in an emergency state does not complete the public safety carrier searching and the synchronization, the neighboring user equipments may take proper steps through the location included in the synchronization channel signal from the user equipment in the emergency state.

Figure 11:
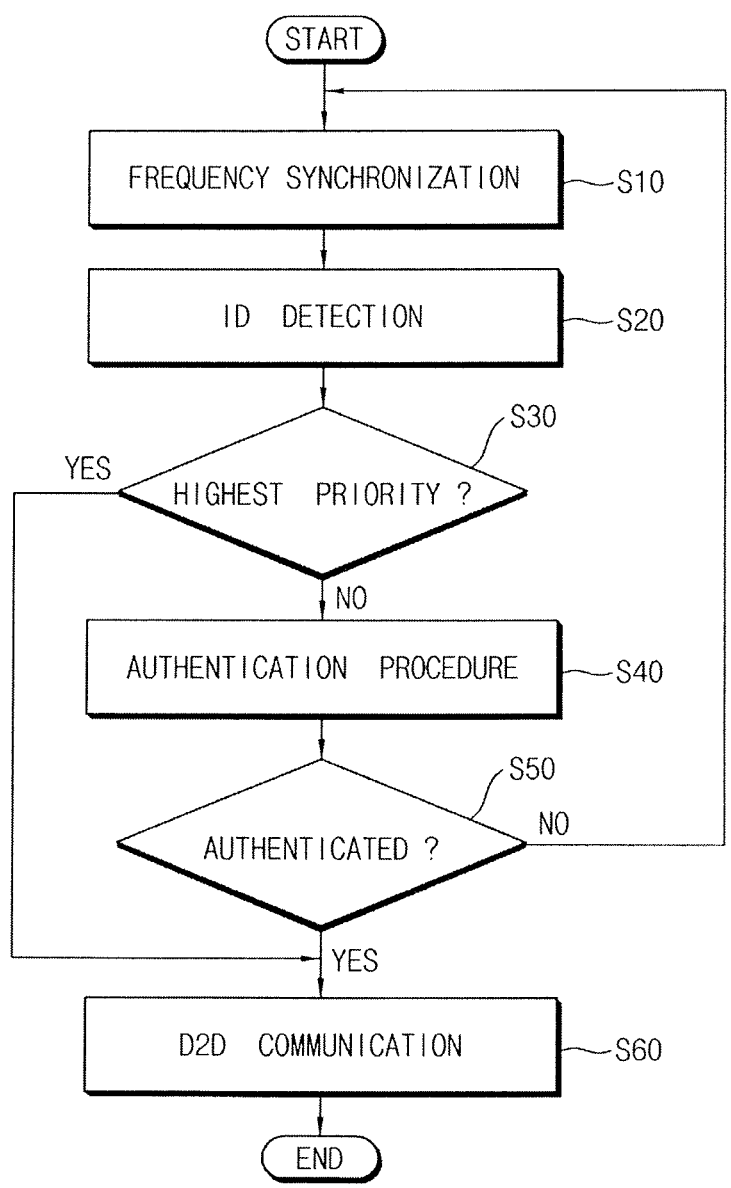
FIG. 11 is a flow chart illustrating a wireless communication method according to various embodiments of the inventive concept.

FIG. 11 is a flow chart illustrating a wireless communication method according to some embodiments of the inventive concept.

Referring to FIG. 11, frequency synchronization is performed between a plurality of user equipments for D2D communication (S10). The frequency synchronization may be performed as described above. Hereinafter, for convenience of descriptions, the wireless communication method is described based on the D2D communication between a first user equipment and a second user equipment.

The first user equipment is set to enter the public safety mode. When entering the public safety mode, the first user equipment is converted to an idle state IDL when the first user equipment enters the public safety mode PSM. During the public safety mode PSM, the first user equipment is temporarily converted from the idle state to a partial wakeup state. A synchronization channel signal is transmitted by the second user equipment locating within a communicative range of the first user equipment for synchronization of the D2D communication during the partial wakeup state. A public safety carrier searching PSCS is performed by the first user equipment for the D2D communication between the first user equipment and the second user equipment during the partial wakeup state. Together with or after the public safety carrier searching, the frequency synchronization (S10) may be performed.

When the frequency synchronization between the first user equipment and the second user equipment is complete, the D2D communication is performed between the first user equipment and the second user equipment.

In some embodiments of the inventive concept, the first user equipment may be out of range of network coverage of a base station, and the second user equipment may be out of range or within the range of network coverage. In other words, the first user equipment may be that of the user in the emergency state and the second user equipment may be that of the user near (e.g. within a communicative range) the first user equipment.

The D2D communication may be performed as follows.

The second user equipment may periodically transmit the synchronization channel signal as described with reference to FIGS. 9 and 10. The first user equipment may receive the synchronization channel signal after the frequency synchronization is completed and obtain or detect the identifier ID of the second user equipment (S20).

The first user equipment may determine whether the identifier of the second user equipment corresponds to the highest priority based on public safety information stored in the first user equipment (S30), as described with reference to FIG. 5.

When the identifier of the second user equipment does not correspond to the highest priority (S30: NO), an authentication procedure is performed by the first user equipment to determine whether to allow the D2D communication between the first user equipment and the second user equipment (S40).

When the authentication procedure is completed successfully (S50: YES), the D2D communication is performed between the first user equipment and the second user equipment (S60). When the authentication procedure failed (S50: NO), the first user equipment again performs the frequency synchronization (S10).

However, when the identifier of the second user equipment corresponds to the highest priority (S30: YES), the authentication procedure is omitted and the D2D communication is performed between the first user equipment and the second user equipment (S60).

The first user equipment may omit the authentication procedure if the identifier of the second user equipment is the predetermined identifier of the highest priority, and the first user equipment may perform the D2D communication promptly regarding the identifier as the scrambling code.

As such, the method of operating a user equipment and the associated wireless communication method according to various embodiments may efficiently support the D2D communication and reduce power consumption by converting the user equipment into the idle state when entering the public safety mode, and temporarily converting the user equipment into the partial wakeup state for public safety carrier searching.

Figure 12:
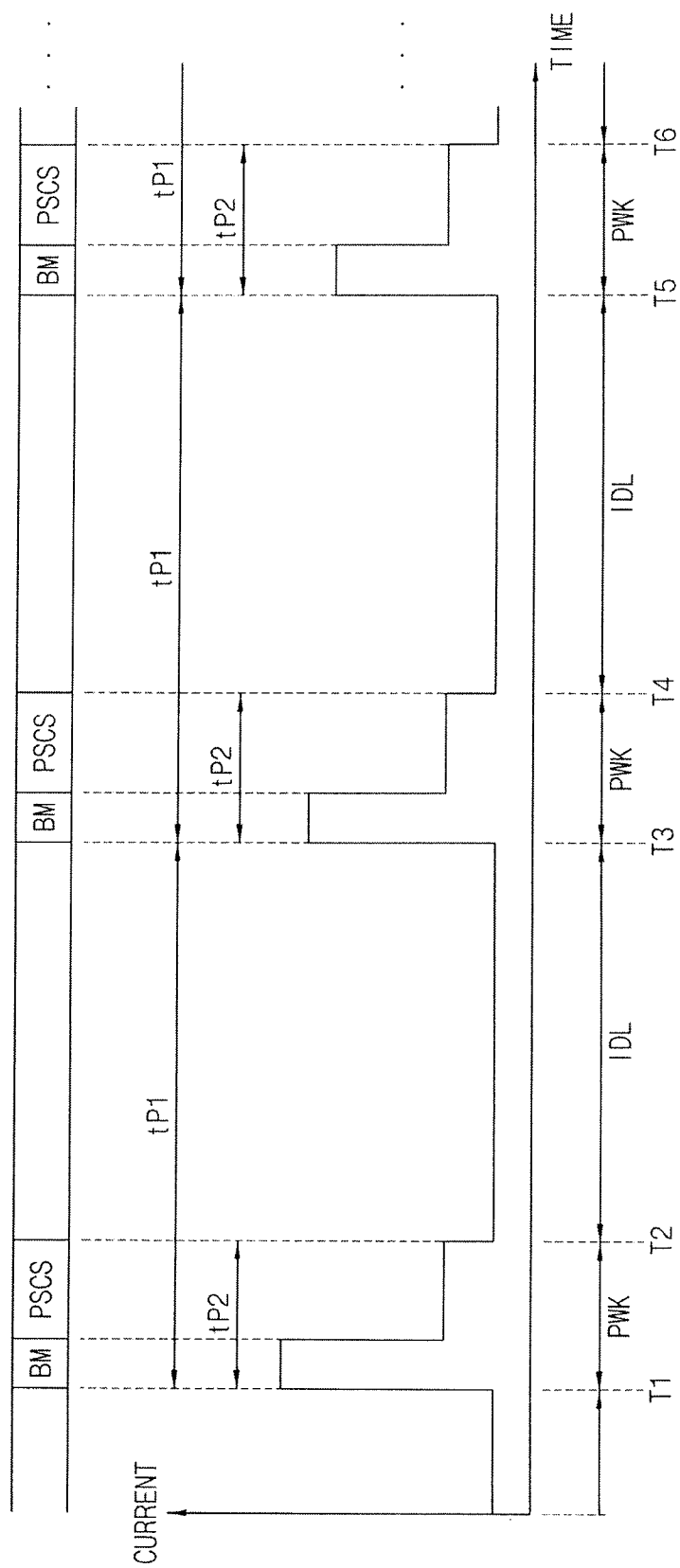
FIG. 12 is a timing diagram illustrating a method of operating a user equipment according to various embodiments of the inventive concept.

FIG. 12 is a timing diagram illustrating a method of operating a user equipment according to an example embodiment.

FIG. 12 illustrates operations of a user equipment after the user equipment enters the public safety mode PSM. In some embodiments of the inventive concept, the user equipment may enter the public safety mode PSM when the user equipment is out of network coverage of a base station or an evolved node B (eNB). The network coverage indicates a spatial range or a state in which the user equipment may communicate with the base station. In other embodiments, even though the user equipment is within the network coverage of the base station, the user equipment may enter the public safety mode PSM based on selection of the user, that is, a mode selection of the user.

Referring to FIG. 12, during the public safety mode PSM, the user equipment is temporarily converted from the idle state IDL to a partial wakeup state PWK. For example, the user equipment may be converted from the idle state IDL to the partial wakeup state PWK by a period of a first time interval tP1, and the user equipment back to the idle state IDL after maintaining the partial wakeup state PWK by a second time interval tP2. In other words, as illustrated in FIG. 9, the user equipment may be converted from the idle state IDL to the partial wakeup state PWK at time points T1, T3 and T5 and the user equipment may be converted back to the idle state IDL at time points T2, T4 and T6.

The user equipment performs a public safety carrier searching PSCS for the D2D communication between the user equipment and a neighboring equipment during the partial wakeup state PWK. As such, if the user equipment enters the public safety mode PSM, the blind searching BLSR for connection to the base station and all operations based on the network connection are stopped and only the public safety carrier searching PSCS is performed. Even though not illustrated in FIG. 12, if the public safety carrier is detected, the user equipment may enter a public safety communication mode after an authentication procedure as will be described below. In addition, the user equipment may further perform transmission BM of a beacon message according to Bluetooth standards by the user equipment during the partial wakeup state PWK.

During the partial wakeup state PWK, a reception portion of the user equipment, for example, RX and RXP in FIG. 5, and a transmission portion, for example, TX and TXP in FIG. 5, may be enabled for the public safety carrier searching PSCS and the transmission BM of the beacon message, and the other portions of the user equipment except the reception portion and the transmission portion may be disabled during the partial wakeup state PWK. The reception portion and the transmission portion may be disabled during the idle state IDL.

As described above, during the public safety mode PSM, the duration time TP2 of the partial wakeup state PWK may be set to be substantially shorter than the duration time tP1-tP2 of the idle state IDL. For example, the duration time tP1-tP2 of the idle state IDL may be about a few seconds and the duration time tP2 of the partial wakeup state PWK may be a few milliseconds through tens milliseconds. As a result, the average current during the public safety mode PSM may be maintained at a lower level and thus power consumption may be reduced significantly.

As such, the method of operating the user equipment according to some embodiments may efficiently support the D2D communication and reduce power consumption by converting the user equipment into the idle state IDL when entering the public safety mode PSM and temporarily converting the user equipment into the partial wakeup state PWK for public safety carrier searching PSCS and transmission BM of the beacon message.

Figure 13:
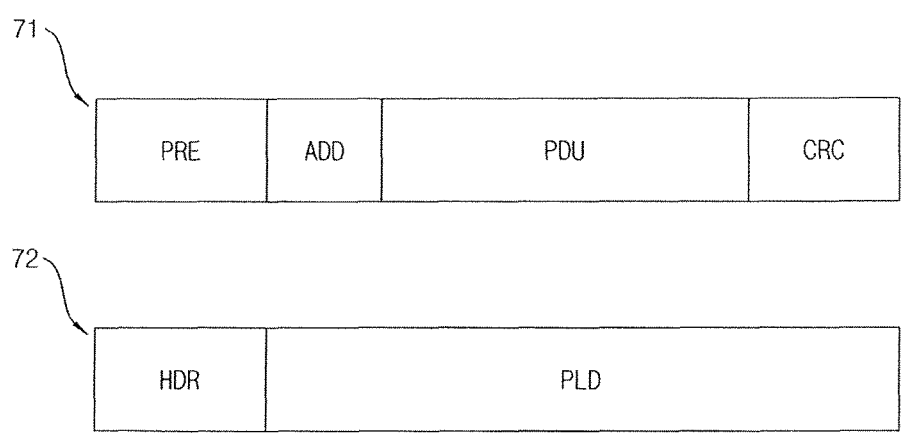
FIG. 13 is a diagram illustrating one example of a synchronization channel signal that may be used in the method of FIG. 12.

FIG. 13 is a diagram illustrating an example of a synchronization channel signal used in the method of FIG. 12.

Referring to FIG. 13, a data channel packet 71 may include a preamble PRE, an access address ADD, a payload unit PDU 72, a cyclic redundancy check code CRC. The payload unit PDU 72 may include a header HDR and a payload field PLD.

The beacon message may be defined by the beacon message format according to the international standards, and the beacon message may be transferred using a low-energy wireless communication protocol. The beacon message format may require minimum data bits so that the transmission energy may be reduced and each packet may include further beacon messages. In some embodiments of the inventive concept, a variable length or size of the beacon message may be allowed depending on purpose or type of the beacon message. For example, some beacon messages may be extremely short as two bits or an octet, whereas other beacon messages may be as long as the maximum size that is specified by the corresponding communication protocol. In some embodiments of the inventive concept, two or more beacon messages may be formatted to be included in the payload PLD of the data channel packet 71.

Figure 14:
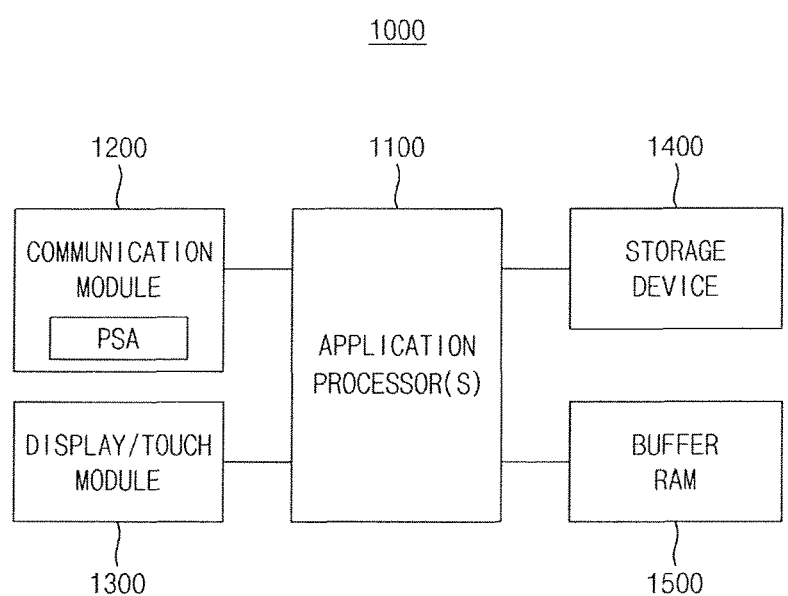
FIG. 14 is a block diagram illustrating a mobile device according to various embodiments.

FIG. 14 is a block diagram illustrating a mobile device according to example embodiments.

Referring to FIG. 14, a mobile device 1000 may include an application processor 1100, a communication module 1200, a display/touch module 1300, a storage device 1400, and a mobile RAM 1500.

The application processor 1100 controls operations of the mobile device 1000. The communication module 1200 is implemented to perform wireless or wire communications with an external device, and may include, for example, a transmitter, a receiver, or a transceiver. The display/touch module 1300 can be implemented as a touch screen to display data processed by the application processor 1100 or to receive data through a touch panel. The storage device 1400 is implemented to store user data. The storage device 1400 may be eMMC, SSD, UFS device, etc. The storage device 1400 may include the non-volatile memory device disclosed herein. The storage device 1400 may have a configuration for performing the above-described ECC and randomization control method.

The buffer RAM 1500 temporarily stores data used for processing operations of the mobile device 1000. For example, the buffer RAM 1500 may be DDR SDRAM, LPDDR SDRAM, GDDR SDRAM, RDRAM, etc.

The mobile device 1000 may include a public safety application PSA that when executed may perform the method of operating the user equipment and the associated wireless communication method according to embodiments of the inventive concept. Even though the public safety application PSA is included in the communication module 1200 in FIG. 14, the public safety application PSA may be included in the application processor 1100. As described above, the public safety application PSA may control entering the public safety mode PSM, converting between the idle state IDL and the partial wakeup state PWK during the public safety mode PSM and public safety carrier searching PSCS during the partial wakeup state PWK. In addition, as described with reference to FIGS. 7 and 8, the public safety application PSA may provide a user interface for entering the public safety mode PSM. Furthermore, as described with reference to FIGS. 9 and 12, the public safety application PSA may control transmission of a synchronization channel signal or a beacon message during the partial wakeup state PWK.

As described above, the method of operating a user equipment and the associated wireless communication method according to various embodiments may efficiently support the D2D communication and reduce power consumption by converting the user equipment into the idle state when entering the public safety mode, and temporarily converting the user equipment into the partial wakeup state for public safety carrier searching.

The present inventive concept may be applied to any devices and systems performing wireless communication. For example, the present inventive concept may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc., just to name a few non-limiting examples.

The foregoing disclosure is illustrative of example embodiments and is not to be construed as limiting thereof. Although a few example embodiments have been described, those skilled in the art will readily appreciate that many modifications are possible in the example embodiments shown and described without materially departing from the present inventive concept.

What is claimed is:

1. A method of operating a user equipment, comprising:
    setting a mode of a user equipment to a public safety mode;
    changing a state of the user equipment to an idle state when the user equipment is in the public safety mode;
    temporarily changing the state of the user equipment from the idle state to a partial wakeup state during operation of the user equipment in the public safety mode;
    performing a public safety carrier searching for device-to-device (D2D) communication between the user equipment and a neighboring equipment within a communicative range during the partial wakeup state; and transmitting a synchronization channel signal by the user equipment for synchronization of the D2D communication during the partial wakeup state.

2. The method of claim 1, wherein setting the mode of the user equipment to the public safety mode occurs when the user equipment is out of network coverage of a base station.

3. The method of claim 1, wherein setting the mode of the user equipment to the public safety mode occurs through a user interface of the user equipment in response to a user selection.

4. The method of claim 1, wherein setting the mode of the user equipment to the public safety mode includes:
  determining whether the user equipment is out of network coverage of a base station; and
  in response to determining that the user equipment is out of the network coverage of the base station, providing a user interface of the user equipment for a user to select the setting of the user equipment to the public safety mode.

5. The method of claim 4, wherein, in response to determining that a user did not select the setting of the user equipment to the public safety mode within a reference time, the user equipment autonomously sets the mode to the public safety mode.

6. The method of claim 1, wherein temporarily changing the state of the user equipment from the idle state to the partial wakeup state includes:
  changing the state of the user equipment from the idle state to the partial wakeup state by a period of a first time interval;
  changing the state of the user equipment back to the idle state after maintaining the partial wakeup state by a second time interval, and
  wherein a duration of the idle state is longer than a duration of the partial wakeup state.

7. The method of claim 1, wherein during the partial wakeup state a reception portion of the user equipment is enabled for the public safety carrier searching and other portions of the user equipment except for the reception portion are disabled, and during the idle state the reception portion is disabled.

8. The method of claim 1, wherein performing the public safety carrier searching is based on public safety information stored in the user equipment, the public safety information including a public safety carrier and an identifier for the D2D communication.

9. The method of claim 1, wherein a reception portion and a transmission portion of the user equipment are enabled for the public safety carrier searching and transmitting the synchronization channel signal and other portions of the user equipment except for the reception portion and the transmission portion are disabled during the partial wakeup state, and wherein the reception portion and the transmission portion are disabled during the idle state.

10. The method of claim 1, wherein the synchronization channel signal includes location information of the user equipment.

11. The method of claim 1, further comprising:
  transmitting a beacon message according to Bluetooth standards by the user equipment during the partial wakeup state.

12. A method of wireless communication, comprising:
  setting a mode of a first user equipment to a public safety mode;
  changing a state of the first user equipment to an idle state when the first user equipment is in the public safety mode;
  temporarily changing the state of the first user equipment from the idle state to a partial wakeup state during operation of the first user equipment in the public safety mode;
  transmitting a synchronization channel signal by a second user equipment located within a communicative range of the first user equipment for synchronization of a device-to-device (D2D) communication during the partial wakeup state;
  performing a public safety carrier searching by the first user equipment for the D2D communication between the first user equipment and the second user equipment during the partial wakeup state;
  when a frequency synchronization between the first user equipment and the second user equipment is completed, performing the D2D communication between the first user equipment and the second user equipment;
  determining whether an identifier of the second user equipment corresponds to a highest priority based on public safety information stored in the first user equipment;
  when the identifier of the second user equipment does not correspond to the highest priority based on public safety information, performing an authentication procedure by the first user equipment to determine whether to allow the D2D communication between the first user equipment and the second user equipment; and
  when the identifier of the second user equipment corresponds to the highest priority based on public safety information, omitting the authentication procedure.

13. The method of claim 12, wherein the first user equipment is out of network coverage of a base station, and the second user equipment is out of network or in the network coverage of the base station.

14. A user equipment comprising:
  an application processor;
  a memory in communication with the application processor;
  a touch screen to display data processed by the application processor to receive data through a touch panel;
  a communication module including a transmitter and a receiver operatively coupled to the application processor;
  wherein at least one of the application processor or the communication module includes a public safety application that when executed configures the user equipment to:
    determine that the user equipment is out of network coverage of a base station;
    provide a user interface displayed by the touch screen to set a public safety mode in response to the determination, and change a state of the user equipment to an idle state when the user equipment is set in the public safety mode;
    temporarily change the state of the user equipment from the idle state to a partial wakeup state during operation of the user equipment in the public safety mode; and
    perform a public safety carrier search for device-to-device (D2D) communication between the user equipment and a neighboring equipment within a communicative range during the partial wakeup state.

15. The user equipment of claim 14, wherein the public safety mode is set in response to a user selection.

16. The user equipment of claim 14, wherein during the partial wakeup state a reception portion of the user equipment is enabled for the public safety carrier searching and other portions of the user equipment except for the reception portion are disabled, and during the idle state the reception portion is disabled.

17. The user equipment of claim 14, wherein the temporary change of the state of the user equipment from the idle state to the partial wakeup state includes:
- change the state of the user equipment from the idle state to the partial wakeup state by a period of a first time interval; and
- change the state of the user equipment back to the idle state after maintaining the partial wakeup state by a second time interval.

\* \* \* \* \*